(12) United States Patent
Horgan et al.

(10) Patent No.: US 9,701,299 B2
(45) Date of Patent: Jul. 11, 2017

(54) SYSTEM AND METHOD FOR CONTROLLING AN ENGINE BASED ON A DESIRED TURBINE POWER TO ACCOUNT FOR LOSSES IN A TORQUE CONVERTER

(71) Applicant: GM Global Technology Operations LLC, Detroit, MI (US)

(72) Inventors: Jeremy V. Horgan, Northville, MI (US); Todd R. Shupe, Milford, MI (US); Christine Cabrera, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 450 days.

(21) Appl. No.: 14/248,571

(22) Filed: Apr. 9, 2014

(65) Prior Publication Data
US 2015/0239451 A1    Aug. 27, 2015

Related U.S. Application Data

(60) Provisional application No. 61/945,370, filed on Feb. 27, 2014.

(51) Int. Cl.
*B60W 10/06* (2006.01)
*B60W 10/02* (2006.01)
(Continued)

(52) U.S. Cl.
CPC .......... *B60W 10/06* (2013.01); *B60W 10/023* (2013.01); *F02D 29/02* (2013.01);
(Continued)

(58) Field of Classification Search
CPC ............. B60W 10/06; B60W 2510/06; B60W 2710/06
See application file for complete search history.

(56) References Cited

U.S. PATENT DOCUMENTS

| 4,964,318 A | 10/1990 | Ganoung |
| 5,019,989 A | 5/1991 | Ueda et al. |
| (Continued) | | |

FOREIGN PATENT DOCUMENTS

| CN | 1088520 C | 6/1994 |
| CN | 1923557 A | 3/2007 |
| (Continued) | | |

OTHER PUBLICATIONS

U.S. Appl. No. 13/955,082, filed Jul. 31, 2013, Livshiz et al.
(Continued)

*Primary Examiner* — Tisha Lewis (57) ABSTRACT

A system includes a desired turbine power module and an engine actuator module. The desired turbine power module determines a desired amount of power at a turbine of a torque converter based on an accelerator pedal position and a vehicle speed. The torque converter transfers torque from an engine to a driveline and includes an impeller and the turbine. The impeller is connected to a crankshaft of the engine. The turbine is connected to a transmission in the driveline and is at least one of hydraulically coupled and mechanically coupled to the impeller. The engine actuator module controls an actuator of the engine based on the desired turbine power.

22 Claims, 5 Drawing Sheets

(51) Int. Cl.
*F02D 29/02* (2006.01)
*F02D 41/02* (2006.01)
*F02D 13/02* (2006.01)
*F02D 17/02* (2006.01)
*F02D 41/10* (2006.01)
*F02D 41/14* (2006.01)

(52) U.S. Cl.
CPC ...... *F02D 41/0215* (2013.01); *F02D 13/0207* (2013.01); *F02D 13/0219* (2013.01); *F02D 17/02* (2013.01); *F02D 41/10* (2013.01); *F02D 2041/1412* (2013.01); *F02D 2200/101* (2013.01); *F02D 2200/1012* (2013.01); *F02D 2400/12* (2013.01)

(56) References Cited

U.S. PATENT DOCUMENTS

| | | | |
|---|---|---|---|
| 5,073,865 A | 12/1991 | Togai et al. | |
| 5,184,527 A | 2/1993 | Nakamura | |
| 5,272,939 A | 12/1993 | Markyvech et al. | |
| 5,325,740 A | 7/1994 | Zhang et al. | |
| 5,496,227 A | 3/1996 | Minowa et al. | |
| 5,573,476 A * | 11/1996 | Minowa | B60W 10/06 477/109 |
| 5,625,558 A | 4/1997 | Togai et al. | |
| 5,628,706 A | 5/1997 | Zhang | |
| 5,772,555 A | 6/1998 | Minowa et al. | |
| 5,776,030 A | 7/1998 | Minowa et al. | |
| 5,779,594 A | 7/1998 | Minowa et al. | |
| 5,792,021 A | 8/1998 | Minowa et al. | |
| 5,954,779 A | 9/1999 | Dietzel | |
| 6,090,011 A | 7/2000 | Minowa et al. | |
| 6,253,144 B1 | 6/2001 | Yamamura et al. | |
| 6,386,180 B1 | 5/2002 | Gerhardt et al. | |
| 6,405,587 B1 | 6/2002 | Livshiz et al. | |
| 6,466,851 B2 | 10/2002 | Kato et al. | |
| 6,679,807 B2 | 1/2004 | Kato et al. | |
| 6,701,246 B2 * | 3/2004 | Riedle | F02D 11/105 123/352 |
| 7,463,970 B2 | 12/2008 | Livshiz et al. | |
| 7,698,049 B2 | 4/2010 | Whitney et al. | |
| 7,704,185 B2 | 4/2010 | Babcock et al. | |
| 7,801,658 B2 | 9/2010 | Ohshima | |
| 8,195,370 B2 | 6/2012 | Simon, Jr. et al. | |
| 8,255,139 B2 | 8/2012 | Whitney et al. | |
| 8,635,004 B2 | 1/2014 | Whitney et al. | |
| 2001/0056320 A1 | 12/2001 | Kato et al. | |
| 2002/0107106 A1 | 8/2002 | Kato et al. | |
| 2003/0097215 A1 | 5/2003 | Riedle et al. | |
| 2004/0034460 A1 | 2/2004 | Folkerts et al. | |
| 2005/0148428 A1 | 7/2005 | Cullen et al. | |
| 2005/0202924 A1 | 9/2005 | Friedmann et al. | |
| 2006/0173602 A1 | 8/2006 | Graf et al. | |
| 2007/0067087 A1 | 3/2007 | Ohshima | |
| 2008/0220934 A1 | 9/2008 | Babcock et al. | |
| 2009/0024263 A1 | 1/2009 | Simon, Jr. et al. | |
| 2009/0182478 A1 | 7/2009 | Whitney et al. | |
| 2010/0280738 A1 | 11/2010 | Whitney et al. | |
| 2011/0118955 A1 | 5/2011 | Livshiz et al. | |
| 2011/0144887 A1 | 6/2011 | Whitney et al. | |
| 2011/0178691 A1 | 7/2011 | Wang et al. | |
| 2011/0257854 A1 | 10/2011 | Whitney et al. | |
| 2012/0234123 A1 | 9/2012 | Whitney et al. | |
| 2012/0265421 A1 | 10/2012 | Livshiz et al. | |
| 2013/0080023 A1 | 3/2013 | Livshiz et al. | |
| 2013/0325233 A1 | 12/2013 | Whitney et al. | |

FOREIGN PATENT DOCUMENTS

| | | | | |
|---|---|---|---|---|
| CN | 101450629 A | | 6/2009 | |
| DE | 4210956 A1 | | 2/1993 | |
| DE | 4235827 A1 | | 4/1994 | |
| DE | 10203954 A1 | | 9/2002 | |
| DE | 102006000431 A1 | | 3/2007 | |
| DE | 102008039574 A1 | | 6/2009 | |
| EP | 0578399 A2 | | 1/1994 | |
| IN | 1495KOL2008 | | 1/2008 | |
| JP | 08178054 A | * | 7/1996 | ............ F16H 41/16 |
| JP | 2003048461 A | | 2/2003 | |
| JP | 2004100528 A | | 4/2004 | |

OTHER PUBLICATIONS

U.S. Appl. No. 13/972,275, filed Aug. 21, 2013, Livshiz et al.
English translation of the Chinese Office Action for CN Serial No. CN200810149762.2 dated Nov. 3, 2010; 7 pages.
Non-Final Office Action dated Nov. 14, 2014 in U.S. Appl. No. 13/955,082; 8 pages.

* cited by examiner

SYSTEM AND METHOD FOR CONTROLLING AN ENGINE BASED ON A DESIRED TURBINE POWER TO ACCOUNT FOR LOSSES IN A TORQUE CONVERTER

CROSS-REFERENCE TO RELATED APPLICATIONS

This application claims the benefit of U.S. Provisional Application No. 61/945,370, filed on Feb. 27, 2014. The disclosure of the above application is incorporated herein by reference in its entirety.

FIELD

The present disclosure relates to internal combustion engines, and more specifically, to systems and methods for controlling an engine based on a desired turbine power to account for losses in a torque converter.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a desired turbine power module and an engine actuator module. The desired turbine power module determines a desired amount of power at a turbine of a torque converter based on an accelerator pedal position and a vehicle speed. The torque converter transfers torque from an engine to a driveline and includes an impeller and the turbine. The impeller is connected to a crankshaft of the engine. The turbine is connected to a transmission in the driveline and is at least one of hydraulically coupled and mechanically coupled to the impeller. The engine actuator module controls an actuator of the engine based on the desired turbine power.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Torque produced by an engine is transferred to a driveline using a torque converter. A torque converter typically includes an impeller, a turbine, and a clutch. The impeller is connected to a crankshaft of the engine, and the turbine connected to a transmission in the driveline. When the clutch is applied, the clutch mechanically couples the turbine to the impeller. When the clutch is released, fluid in the torque converter hydraulically couples the turbine to the impeller.

Some systems and methods control the amount of torque produced by an engine based on an engine power request. The systems and methods may determine the engine power request based on an accelerator pedal position and a vehicle speed using a lookup table. The systems and methods may then determine an engine torque request by dividing the engine power request by the engine speed, and may control the amount of torque produced by the engine based on the engine torque request. Controlling engine torque based on engine power may not account for torque losses in the torque converter when the torque converter clutch is released. Thus, controlling engine torque based on engine power may yield less vehicle acceleration than expected by a driver for a given pedal position and a given vehicle speed.

Some systems and methods control the amount of torque produced by an engine based on an axle torque request. The systems and methods may determine the axle torque request based on an accelerator pedal position and a vehicle speed using a lookup table. The systems and methods may then determine an engine torque request by dividing the axle torque request by a gear ratio associated with a driveline, and may control the amount of torque produced by the engine based on the engine torque request.

Controlling engine torque based on axle torque may account for torque losses in a torque converter. However, controlling engine torque based on axle torque requires security measures to ensure that the gear ratio is accurate. In addition, controlling engine torque based on axle torque may require complex calibration work to determine the relationship between the accelerator pedal position, the vehicle speed, and the axle torque request.

A system and method according to the present disclosure controls the amount of torque produced by an engine based on a desired turbine power. The system and method may determine the desired turbine power based on an accelerator pedal position and a vehicle speed using a lookup table. The system and method may then determine a desired engine speed based on a predetermined relationship between the desired turbine power, an actual turbine speed, and the desired engine speed. The predetermined relationship may depend on properties of the torque converter that affect torque losses in the torque converter.

Controlling engine torque based on turbine power in this manner accounts for torque losses in a torque converter. In addition, controlling engine torque based on turbine power does not require security measures to ensure that a driveline gear ratio is accurate. Further, controlling engine torque based on turbine power may not require as much calibration work as controlling engine torque based on axle torque.

Figure 1:
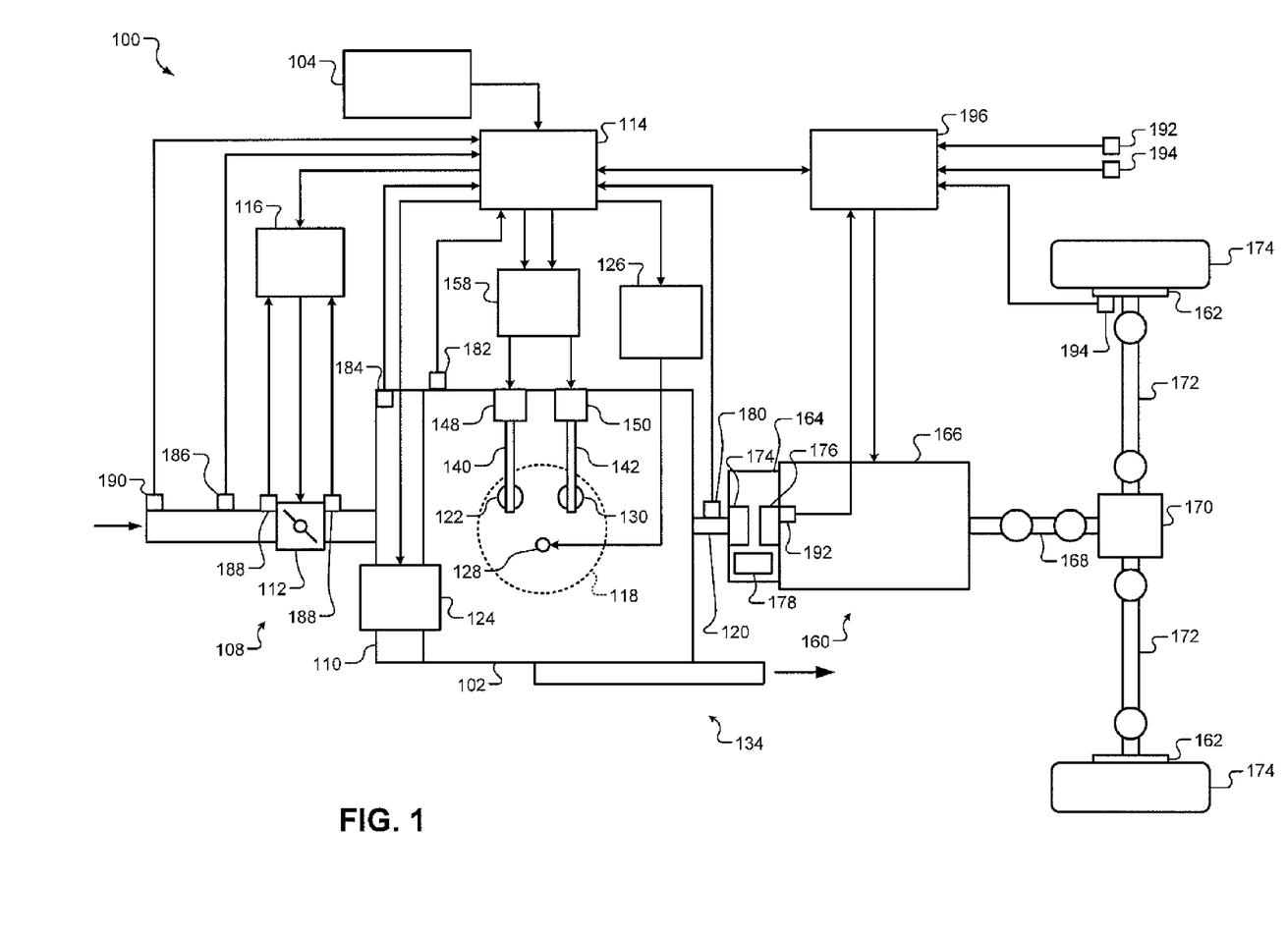
FIG. 1 is a functional block diagram of an example engine system according to the principles of the present disclosure.

Referring now to FIG. 1, vehicle system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. The drivetrain system 160 includes a torque converter 164, a transmission 166, a drive shaft 168, a differential 170, and axle shafts 172. The torque converter 164, the transmission 166, and the differential 170 amplify engine torque by several gear ratios to provide axle torque at the axle shafts 172.

The torque converter 164 couples the crankshaft 120 to the transmission 166. The torque converter 164 includes an impeller 174, a turbine 176, and a clutch 178. The impeller 174 is mechanically coupled to the crankshaft 120 and the turbine 176 is mechanically coupled to the transmission 166. When the clutch 178 is applied, the clutch 178 mechanically couples the turbine 176 to the impeller 174. When the clutch 178 is released, fluid in the torque converter 164 hydraulically couples the turbine 176 to the impeller 174.

The engine system 100 may measure the position of the crankshaft 120 using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 188. The ambient temperature of air being drawn into the engine 102 may be measured using an intake air temperature (IAT) sensor 190. The speed of the turbine 176 may be measured using a turbine speed (TS) sensor (TSS) 192. The speed of the wheels 162 may be measured using a wheel speed (WS) sensor 194. The ECM 114 may use signals from the sensors to make control decisions for the engine system 100.

The ECM 114 may communicate with a transmission control module (TCM) 196 to coordinate shifting gears in the transmission 166. For example, the ECM 114 may reduce engine torque during a gear shift. Although some of the sensor signals are shown provided to the TCM 196, the TCM 196 may relay these sensor signals to the ECM 114. Alternatively, these sensor signals may be provided to the ECM 114 directly. In various implementations, various functions of the ECM 114 and the TCM 196 may be integrated into one or more modules.

Figure 2:
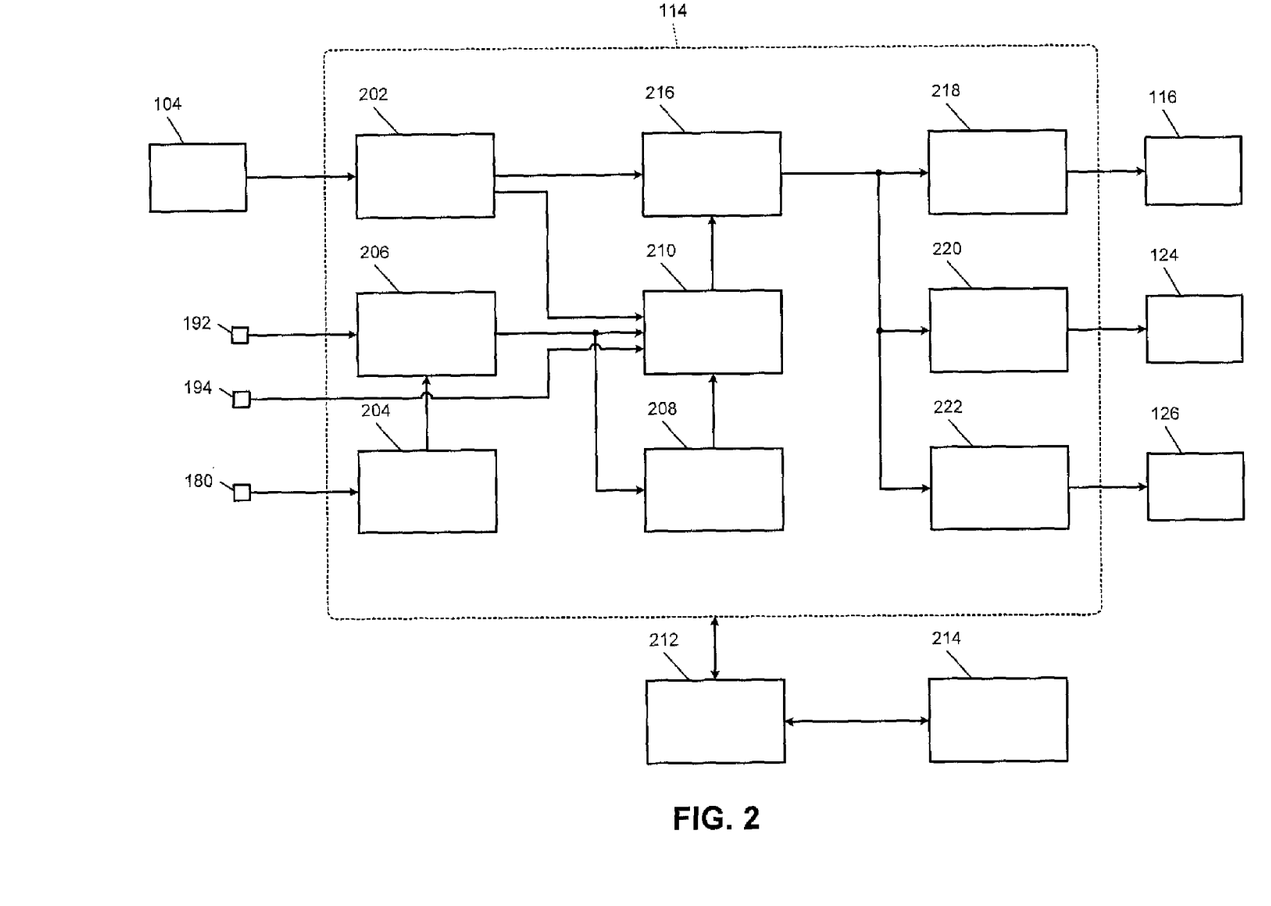
FIG. 2 is a functional block diagram of an example control system according to the principles of the present disclosure.

Referring now to FIG. 2, an example implementation of the ECM 114 includes a desired turbine power module 202. The desired turbine power module 202 determines a desired power at the turbine 176 based on the accelerator pedal position and the vehicle speed. The desired turbine power module 202 may receive the accelerator pedal position from the driver input module 104. The desired turbine power module 202 may determine the vehicle speed based on the wheel speed from the wheel speed sensor 194.

The desired turbine power module 202 may determine the desired turbine power based on a predetermined relationship between the accelerator pedal position, the vehicle speed, and the desired turbine power. The predetermined relationship may be embodied in a lookup table and/or an equation, and may depend on properties of the torque converter 164. The desired turbine power module 202 outputs the desired turbine power.

An actual engine speed module 204 determines the actual speed of the engine 102 based on the crankshaft position from the CKP sensor 180. For example, the actual engine speed module 204 may calculate the actual engine speed based on a period that elapses as the crankshaft 120 completes one or more revolutions. The actual engine speed module 204 outputs the actual engine speed.

A speed ratio module 206 determines a first ratio of an actual speed of the turbine 176 to the actual engine speed. The first ratio may be referred to as a speed ratio. The speed ratio module 206 may receive the actual turbine speed from the turbine speed sensor 192. The speed ratio module 206 outputs the speed ratio.

A torque ratio module 208 determines a second ratio of an actual torque at the turbine 176 to an actual torque at the engine 102. The second ratio may be referred to as a torque ratio. The torque ratio module 208 may determine the torque ratio based on the speed ratio. For example, the torque ratio module 208 may determine the torque ratio based on a predetermined relationship between the speed ratio and the torque ratio. The predetermined relationship may be embodied in a lookup table and/or an equation, and may depend on properties of the torque converter 164 that affect torque losses in the torque converter 164.

A desired engine speed module 210 determines a desired speed of the engine 102. The desired engine speed module 210 may determine the desired engine speed based on the actual turbine speed, the actual engine speed, and/or the speed ratio. The desired engine speed module 210 outputs the desired engine speed.

The desired engine speed module 210 may adjust the desired engine speed to a first speed when the speed ratio is greater than a predetermined value (e.g., 0.85). The first speed may be equal to the actual turbine speed. The desired engine speed module 210 may adjust the desired engine speed to a second speed when the speed ratio is less than or equal to the predetermined value. The second speed may be equal to a product of the actual turbine speed and the torque ratio.

The speed ratio may be greater than the predetermined value when the torque converter 164 is closed. The torque converter 164 is closed when the clutch 178 is fully applied such that the actual turbine speed is equal to the actual engine speed. The speed ratio may also be greater than the predetermined value when the torque converter 164 is slipping. The torque converter 164 is slipping when the clutch 178 is partially applied such that the actual turbine speed is less than the actual engine speed. The speed ratio may be less than or equal to the predetermined value when the torque converter 164 is open. The torque converter 164 is open when the clutch 178 is fully released.

The desired engine speed module 210 may adjust the desired engine speed from the first speed to the second speed when the clutch 178 is released. The desired engine speed module 210 may adjust the desired engine speed from the second speed to the first speed when the clutch 178 is applied. The desired engine speed module 210 may ramp the desired engine speed from the first speed to the second speed or vice versa in a linear or nonlinear manner.

The desired engine speed module 210 may adjust the desired engine speed between the first speed and the second speed based on a current value of the actual engine speed and a future value of the actual engine speed. When the clutch 178 is released, the desired engine speed module 210 may predict the future value of the actual engine speed based on the actual turbine speed and the desired turbine power. When the clutch 178 is applied, the desired engine speed module 210 may predict the future value of the actual engine speed based on the actual turbine speed alone.

In various implementations, when the torque converter 164 is open, the desired engine speed module 210 may determine the desired engine speed based on the actual turbine speed and the desired turbine power. For example, the desired engine speed module 210 may determine the desired engine speed based on a predetermined relationship between the actual turbine speed, the desired turbine power, and the desired engine speed. The predetermined relationship may be embodied in a lookup table and/or an equation and may depend on properties of the torque converter 164 that affect torque losses in the torque converter 164 when the torque converter 164 is open.

The desired engine speed module 210 may determine the values in the lookup table. Alternatively, the values in the lookup table may be determined in a laboratory setting using a calibration module 212 that communicates with the ECM 114. The desired engine speed module 210 and/or a storage module 214 may store the values determined on, for example, non-transitory tangible computer readable medium.

The lookup table may include a plurality of engine speeds that each correspond to a given turbine speed and a given turbine power. Each value in the lookup table may be determined by selecting an engine speed and calculating a turbine power based on the selected engine speed and the given turbine speed. This process may be repeated in an iterative manner until the calculated turbine power is equal to the given turbine power. The engine speed corresponding to the calculated turbine power may then be stored in the lookup table for the given turbine speed and the given turbine power.

In one example, to determine each value in the lookup table, all possible engine speeds may be calculated for a given turbine speed and a predetermined set of torque converter clutch (TCC) slip values. TCC slip is a difference between the engine speed and the turbine speed. Thus, each engine speed may be calculated by determining the sum of the turbine speed and one of the TCC slip values in the predetermined set.

Then, for each engine speed, an engine torque may be calculated by dividing a given power request by the engine speed. In addition, for each engine speed, a speed ratio may be calculated by dividing the given turbine speed by the engine speed. A torque ratio may be calculated for each engine speed based on the speed ratio using, for example, a lookup table and/or an equation. An efficiency value may be determined for each engine speed by calculating a product of the speed ratio and the torque ratio.

A K factor may be determined for each engine speed based on the speed ratio and the torque ratio using, for example, a lookup table and/or an equation. The K factor indicates a relationship between the engine speed and a desired engine torque when the torque converter 164 is open. The desired engine torque for each engine speed may then be determined by calculating a square of a quotient of the engine speed and the K factor.

A turbine power may then be calculated for each engine speed by determining a product of the engine speed, the torque ratio, and the efficiency value. The difference between the calculated turbine power and the given turbine power may be determined for each engine speed. The engine speed with the smallest difference between the calculated turbine power and the given turbine power may be stored in the lookup table as the desired engine speed for the given turbine speed and the given turbine power. Instead of calculating a turbine power for all of the possible engine speeds, the turbine power may be calculated for selected ones of the possible engine speeds until the calculated turbine power is within a predetermined range of the given turbine power.

The desired engine torque module 216 determines a desired torque of the engine 102 based on the desired turbine power and the desired engine speed. The desired engine torque module 216 may divide the desired turbine power by the desired engine speed to obtain the desired engine torque. The desired engine torque module 216 outputs the desired engine torque.

A throttle control module 218 controls the throttle valve 112 by, for example, sending a desired throttle area to the throttle actuator module 116. A fuel control module 220 controls fuel injection in the engine 102 by, for example, sending a desired fueling rate to the fuel actuator module 124. A spark control module 222 controls the spark plug 128 by, for example, sending desired spark timing to the spark actuator module 126.

The throttle control module 218, the fuel control module 220, and the spark control module 222 may adjust the desired throttle area, the desired fueling rate, and the desired spark timing, respectively, based on the desired engine torque. For example, the throttle control module 218 may increase the desired throttle area when the desired engine torque increases. In addition, the fuel control module 220 may increase the desired fueling rate when the desired throttle area increase in order to achieve a stoichiometric air/fuel ratio.

Figure 3:
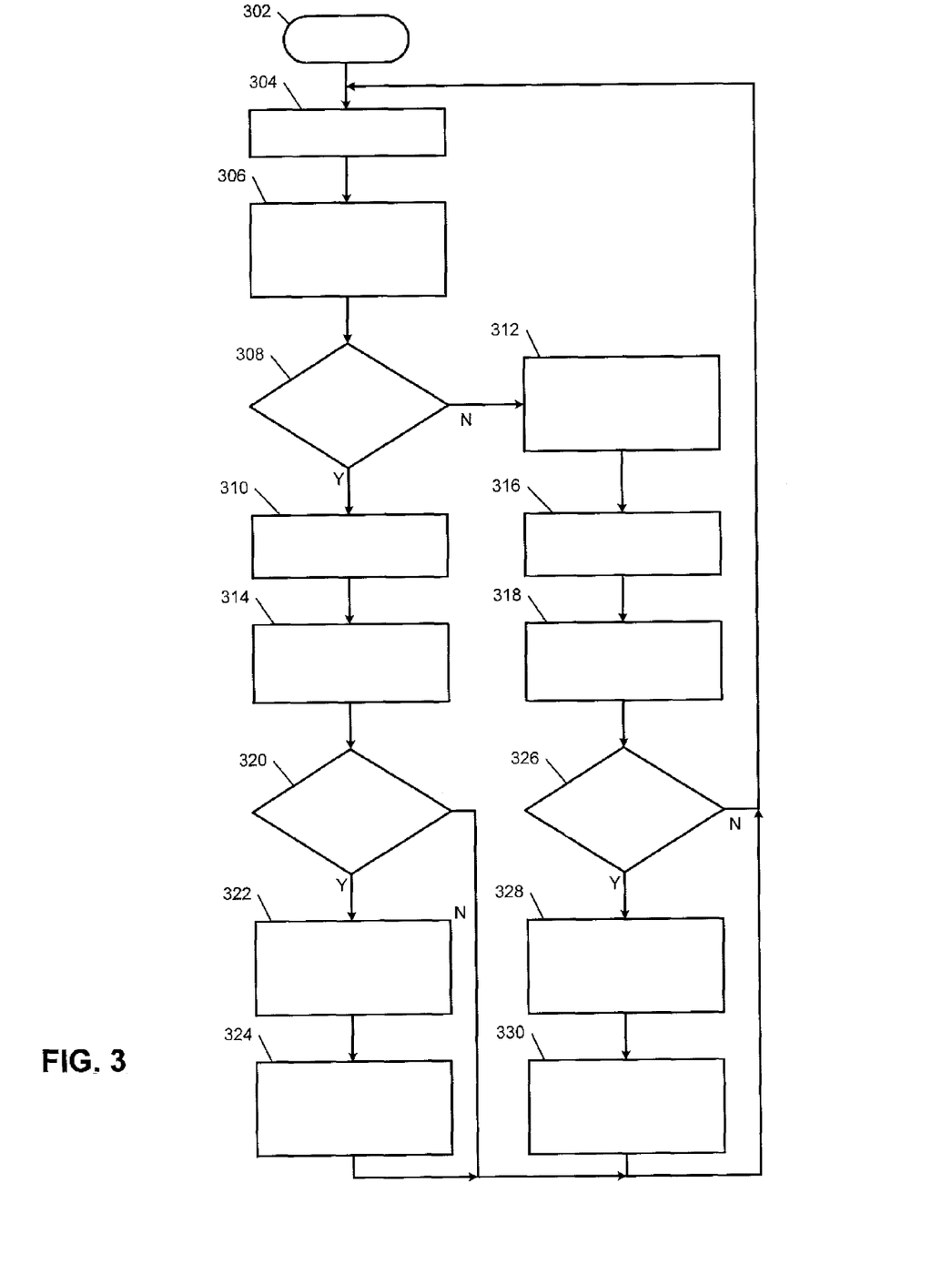
FIG. 3 is a flowchart illustrating an example control method according to the principles of the present disclosure.

Referring now to FIG. 3, a method for controlling an engine based on a desired power at a turbine of a torque converter to account for torque losses in the torque converter begins at 302. At 304, the method determines the desired turbine power based on the position of an accelerator pedal and the speed of a vehicle. The method may determine the desired turbine power based on a predetermined relationship between the accelerator pedal position, the vehicle speed, and the desire turbine power. The predetermined relationship may be embodied in a lookup table and/or an equation, and may depend on properties of the torque converter.

At 306, the method determines a first ratio of an actual speed of the turbine to an actual speed of the engine. The first ratio may be referred to as a speed ratio. At 308, the method determines whether the speed ratio is greater than a predetermined value (e.g., 0.85). If the speed ratio is greater than the predetermined value, the method continues at 310. Otherwise, the method continues at 312.

The speed ratio may be greater than the predetermined value when the torque converter is closed. The speed ratio may also be greater than the predetermined value when the torque converter is slipping. The speed ratio may be less than or equal to the predetermined value when the torque converter is open.

At 310, the method determines a first speed. The first speed may be equal to the actual turbine speed. At 314, the method adjusts the desired engine speed to the first speed. At 312, the method determines a second ratio of an actual torque at the turbine to an actual torque at the engine. The second ratio may be referred to as a torque ratio.

At 316, the method determines a second speed. The second speed may be equal to a product of the actual turbine speed and the torque ratio. At 318, the method adjusts the desired engine speed to the second speed.

At 320, the method determines whether the desired engine speed is transitioning from the second speed to the first speed. If the desired engine speed is transitioning from the second speed to the first speed, the method continues at 322. Otherwise, the method continues at 304. At 322, the method predicts a future value of the actual engine speed based on the actual turbine speed. At 324, the method adjusts the desired engine speed from the second speed to the first speed based on a current value of the actual engine speed and the future value of the actual engine speed.

At 326, the method determines whether the desired engine speed is transitioning from the first speed to the second speed. If the desired engine speed is transitioning from the first speed to the second speed, the method continues at 328. Otherwise, the method continues at 304. At 328, the method predicts a future value of the actual engine speed based on the actual turbine speed and the desired turbine power. At 330, the method adjusts the desired engine speed from the first speed to the second speed based on the current value of the actual engine speed and the future value of the actual engine speed.

In various implementations, when the torque converter is open, the method may determine the desired engine speed based on the actual turbine speed and the desired turbine power. For example, the method may determine the desired engine speed based on a predetermined relationship between the actual turbine speed, the desired turbine power, and the desired engine speed. The predetermined relationship may be embodied in a lookup table and/or an equation and may depend on properties of the torque converter that affect torque losses in the torque converter when the torque converter is open.

The lookup table may include a plurality of engine speeds that each correspond to a given turbine speed and a given turbine power. The method may determine each value in the lookup table by selecting an engine speed and calculating a turbine power based on the selected engine speed and the given turbine speed. The method may repeat this process in an iterative manner until the calculated turbine power is equal to the given turbine power. The method may then store the corresponding engine speed in the lookup table for the given turbine speed and the given turbine power.

Figure 4:
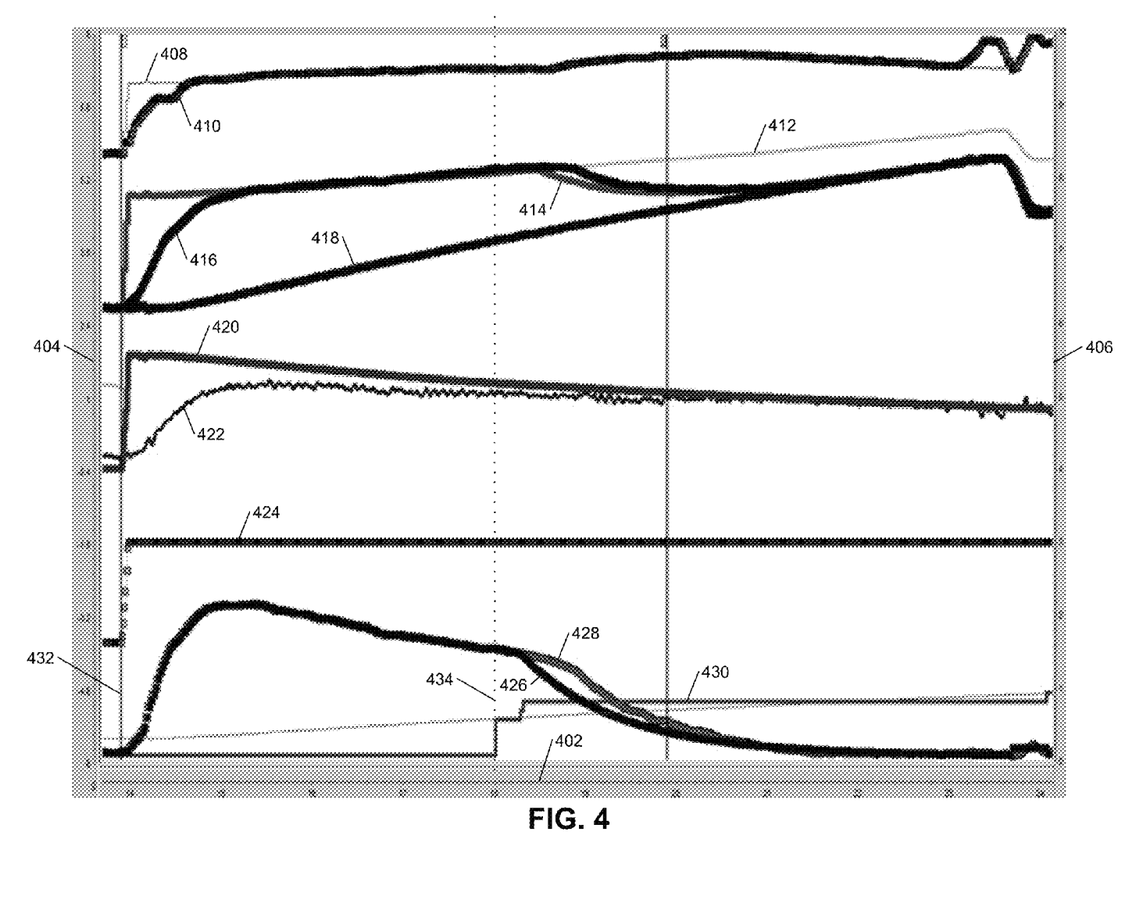
FIGS. 4 and 5 are graphs illustrating example engine operating conditions according to the principles of the present disclosure.

Referring now to FIG. 4, a graph illustrates vehicle operating conditions when an accelerator pedal is depressed by 25 percent (%) while a transmission is in third gear, a vehicle is traveling 18 kilometers per hour (kph), and engine torque is controlled based on engine power. The vehicle operating conditions are plotted with respect to an x-axis 402 that represents time in seconds (s), a y-axis 404 that represents acceleration in g-force (g), and a y-axis 406 that represents a magnitude of some of the vehicle operating conditions in volts (V).

The vehicle operating conditions include a desired engine torque 408, an actual engine torque 410, a desired engine speed 412, a desired engine speed 414, an actual engine speed 416, an actual turbine speed 418, a target vehicle acceleration 420, an actual vehicle acceleration 422, and an actual accelerator pedal depression 424. The desired engine speed 412 is determined based on a K factor. The desired engine speed 414 is used to determine the desired engine torque 408. The target vehicle acceleration 420 is adjusted based on a relationship between accelerator pedal position, vehicle speed, and vehicle acceleration. The relationship may be predetermined based on driver expectations.

The vehicle operating conditions also include a desired torque converter clutch (TCC) slip 426, an actual TCC slip 428, and a TCC state 430. When the TCC state 430 corresponds to about 0 V, the TCC state 430 is off and a clutch in a torque converter is released. When the TCC state 430 corresponds to about 1 V, the TCC state 430 is on and the torque converter clutch is applied.

At 432, the actual accelerator pedal depression 424 starts to increase. In turn, the target vehicle acceleration 420 is increased rapidly and then slowly decreased. A desired engine power and the desired engine speed 414 are increased in response to the increase in the target vehicle acceleration 420, and the desired engine torque 408 is determined by dividing the desired engine power by the desired engine speed 414. As a result, the actual vehicle acceleration 422 is increased rapidly and then slowly decreased in a manner that generally tracks the target vehicle acceleration 420. As discussed above, controlling engine torque based on engine power may not account for torque losses in the torque converter. Thus, the actual vehicle acceleration 422 may not track the target vehicle acceleration 420 as closely as desired.

At 434, the TCC state 430 is switched from off to on. In turn, the desired engine speed 414 is decreased or ramped down from the desired engine speed 412 to the actual turbine speed 418. Decreasing the desired engine speed 414 from the desired engine speed 412 to the actual turbine speed 418 prevents an abrupt change in the actual engine speed 416 when the torque converter clutch is applied as commanded.

Figure 5:
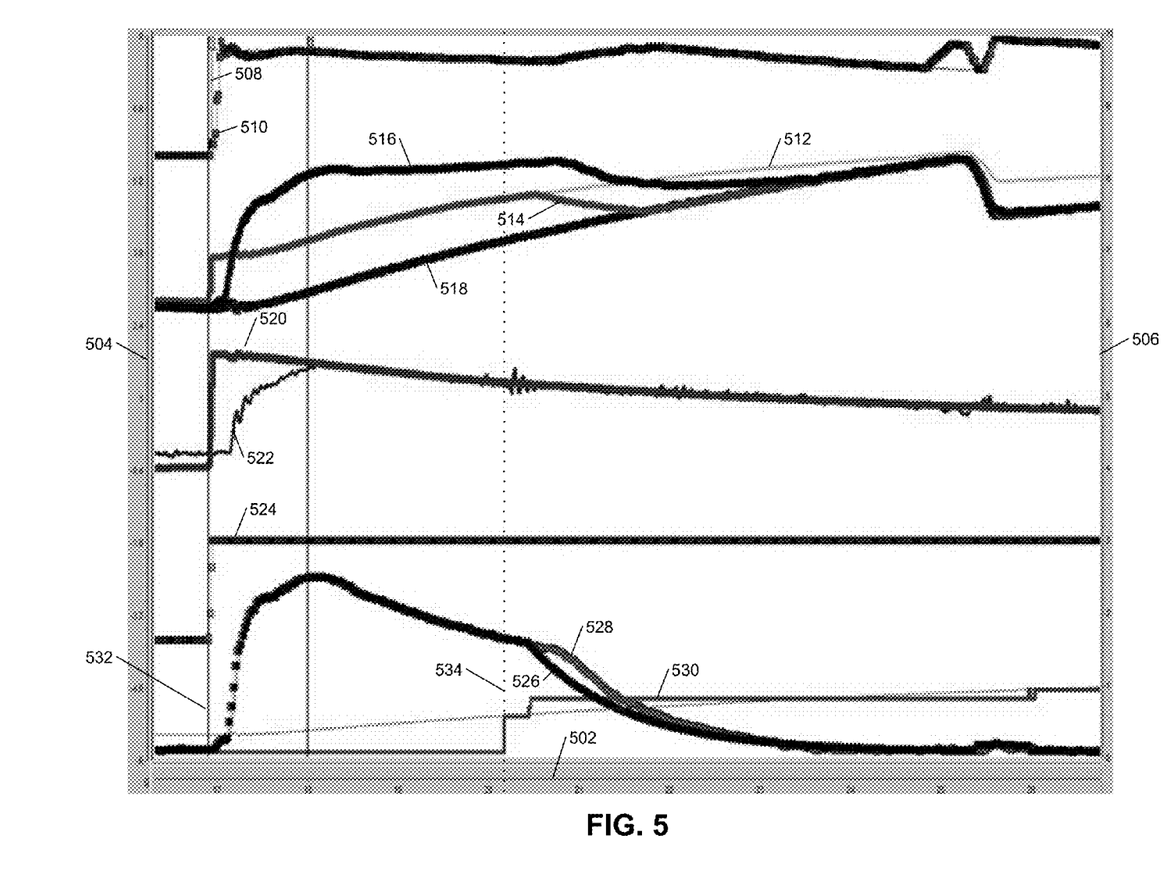

Referring now to FIG. 5, a graph illustrates vehicle operating conditions when an accelerator pedal is depressed by 25% while a transmission is in third gear, a vehicle is traveling 18 kph, and engine torque is controlled based on turbine power. The vehicle operating conditions are plotted with respect to an x-axis 502 that represents time in seconds (s), a y-axis 504 that represents acceleration in g, and a y-axis 506 that represents a magnitude of some of the vehicle operating conditions in V.

The vehicle operating conditions include a desired engine torque 508, an actual engine torque 510, a desired engine speed 512, a desired engine speed 514, an actual engine speed 516, an actual turbine speed 518, a target vehicle acceleration 520, an actual vehicle acceleration 522, and an actual accelerator pedal depression 524. The desired engine speed 512 is determined based on a K factor. The desired engine speed 514 is used to determine the desired engine torque 508. The target vehicle acceleration 520 is adjusted based on a predetermined relationship between accelerator pedal position, vehicle speed, and vehicle acceleration.

The vehicle operating conditions also include a desired torque converter clutch (TCC) slip 526, an actual TCC slip 528, and a TCC state 530. When the TCC state 530 corresponds to about 0 V, the TCC state 530 is off and a clutch in a torque converter is released. When the TCC state 530 corresponds to about 1 V, the TCC state 530 is on and the torque converter clutch is applied.

At 532, the actual accelerator pedal depression 524 starts to increase. In turn, the target vehicle acceleration 520 is increased rapidly and then slowly decreased. A desired turbine power and the desired engine speed 514 are increased in response to the increase in the target vehicle acceleration 520, and the desired engine torque 508 is determined by dividing the desired turbine power by the desired engine speed 514. As a result, the actual vehicle acceleration 522 is increased rapidly and then slowly decreased in a manner that substantially tracks the target vehicle acceleration 520. Controlling engine torque based on turbine power as discussed above accounts for torque losses in the torque converter. Thus, the actual vehicle acceleration tracks the target vehicle acceleration more closely in FIG. 5 than in FIG. 4.

At 534, the TCC state 530 is switched from off to on. In turn, the desired engine speed 514 is decreased or ramped down from the desired engine speed 512 to the actual turbine speed 518 to prevent an abrupt change in the actual engine speed 516. The actual turbine speed 418 may be the first speed discussed above, and the desired engine speed 412 may be the second speed discussed above. When the TCC state 530 is switched from off to on, the desired engine speed 514 is adjusted from the desired engine speed 512 to the actual turbine speed 518 based on the actual turbine speed 518 alone. When the TCC state 530 is switched from on to off, the desired engine speed 514 is adjusted from the actual turbine speed 518 to the desired engine speed 512 based on the actual turbine speed 518 and the desired turbine power.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a desired turbine power module that determines a desired amount of power at a turbine of a torque converter based directly on an accelerator pedal position and a vehicle speed, wherein:
the torque converter transfers torque from an engine to a driveline and includes an impeller and the turbine;
the impeller is connected to a crankshaft of the engine; and
the turbine is connected to a transmission in the driveline and is at least one of hydraulically coupled and mechanically coupled to the impeller; and
an engine actuator module that controls an actuator of the engine based on the desired turbine power.

2. The system of claim 1 further comprising a desired engine torque module that determines a desired engine torque based on the desired turbine power and a desired speed of the engine, wherein the engine actuator module controls the engine actuator based on the desired engine torque.

3. The system of claim 2 further comprising a desired engine speed module that determines the desired engine speed based on at least one of an actual turbine speed, an actual engine speed, and a first ratio of the actual turbine speed to the actual engine speed.

4. The system of claim 3 wherein the desired engine speed module determines the desired engine speed based on the actual turbine speed and the desired turbine power.

5. A system comprising:
a desired turbine power module that determines a desired amount of power at a turbine of a torque converter based on an accelerator pedal position and a vehicle speed, wherein:
the torque converter transfers torque from an engine to a driveline and includes an impeller and the turbine;
the impeller is connected to a crankshaft of the engine; and
the turbine is connected to a transmission in the driveline and is at least one of hydraulically coupled and mechanically coupled to the impeller;
an engine actuator module that controls an actuator of the engine based on the desired turbine power;
a desired engine torque module that determines a desired engine torque based on the desired turbine power and a desired speed of the engine, wherein the engine actuator module controls the engine actuator based on the desired engine torque; and
a desired engine speed module that determines the desired engine speed based on at least one of an actual turbine speed, an actual engine speed, and a first ratio of the actual turbine speed to the actual engine speed,
wherein the desired engine speed module determines the desired engine speed based on the actual turbine speed and the desired turbine power, and
wherein, when the first ratio is greater than a predetermined value, the desired engine speed module adjusts the desired engine speed to a first speed that is equal to the actual turbine speed.

6. The system of claim 5 wherein, when the first ratio is less than or equal to the predetermined value, the desired engine speed module adjusts the desired engine speed to a second speed that is equal to a product of the actual turbine speed and a second ratio of an actual turbine torque to an actual engine torque.

7. The system of claim 6 further comprising a torque ratio module that determines the second ratio based on the first ratio.

8. The system of claim 6 wherein the desired engine speed module adjusts the desired engine speed between the first speed and the second speed based on a current value of the actual engine speed and a future value of the actual engine speed.

9. The system of claim 8 wherein, when a clutch in the torque converter is applied, the desired engine speed module predicts the future value of the actual engine speed based on the actual turbine speed.

10. The system of claim 8 wherein, when a clutch in the torque converter is released, the desired engine speed module predicts the future value of the actual engine speed based on the actual turbine speed and the desired turbine power.

11. A method comprising:
determining a desired amount of power at a turbine of a torque converter based directly on an accelerator pedal position and a vehicle speed, wherein:
the torque converter transfers torque from an engine to a driveline and includes an impeller and the turbine;
the impeller is connected to a crankshaft of the engine; and
the turbine is connected to a transmission in the driveline and is at least one of hydraulically coupled and mechanically coupled to the impeller; and
controlling an actuator of the engine based on the desired turbine power.

12. The method of claim 11 further comprising:
determining a desired engine torque based on the desired turbine power and a desired speed of the engine; and
controlling the engine actuator based on the desired engine torque.

13. The method of claim 12 further comprising determining the desired engine speed based on at least one of an actual turbine speed, an actual engine speed, and a first ratio of the actual turbine speed to the actual engine speed.

14. The method of claim 13 further comprising determining the desired engine speed based on the actual turbine speed and the desired turbine power.

15. A method comprising:
determining a desired amount of power at a turbine of a torque converter based on an accelerator pedal position and a vehicle speed, wherein:
the torque converter transfers torque from an engine to a driveline and includes an impeller and the turbine;
the impeller is connected to a crankshaft of the engine; and
the turbine is connected to a transmission in the driveline and is at least one of hydraulically coupled and mechanically coupled to the impeller;
controlling an actuator of the engine based on the desired turbine power;
determining a desired engine torque based on the desired turbine power and a desired speed of the engine;
controlling the engine actuator based on the desired engine torque;
determining the desired engine speed based on at least one of an actual turbine speed, an actual engine speed, and a first ratio of the actual turbine speed to the actual engine speed;
determining the desired engine speed based on the actual turbine speed and the desired turbine power; and
when the first ratio is greater than a predetermined value, adjusting the desired engine speed to a first speed that is equal to the actual turbine speed.

16. The method of claim 15 further comprising, when the first ratio is less than or equal to the predetermined value, adjusting the desired engine speed to a second speed that is equal to a product of the actual turbine speed and a second ratio of an actual turbine torque to an actual engine torque.

17. The method of claim 16 further comprising determining the second ratio based on the first ratio.

18. The method of claim 16 further comprising adjusting the desired engine speed between the first speed and the second speed based on a current value of the actual engine speed and a future value of the actual engine speed.

19. The method of claim 18 further comprising predicting the future value of the actual engine speed based on the actual turbine speed when a clutch in the torque converter is applied.

20. The method of claim 18 further comprising predicting the future value of the actual engine speed based on the actual turbine speed and the desired turbine power when a clutch in the torque converter is released.

21. The system of claim 1 wherein the desired turbine power module determines the desired turbine power independent of a gear ratio of the driveline.

22. The method of claim 11 further comprising determining the desired turbine power independent of a gear ratio of the driveline.

* * * * *